US012307492B2

(12) United States Patent
Yates

(10) Patent No.: US 12,307,492 B2
(45) Date of Patent: May 20, 2025

(54) DYNAMIC CONTEXTUAL GENERATION OF CREATIVE CONTENT FOR PRODUCT LISTINGS

(71) Applicant: Promoted.ai, Inc., San Francisco, CA (US)

(72) Inventor: Andrew Donald Yates, San Francisco, CA (US)

(73) Assignee: Promoted.ai, Inc., San Francisco, CA (US)

( * ) Notice: Subject to any disclaimer, the term of this patent is extended or adjusted under 35 U.S.C. 154(b) by 0 days.

(21) Appl. No.: 18/823,432

(22) Filed: Sep. 3, 2024

(65) Prior Publication Data
US 2025/0095040 A1    Mar. 20, 2025

Related U.S. Application Data

(60) Provisional application No. 63/538,903, filed on Sep. 18, 2023.

(51) Int. Cl.
G06Q 30/00    (2023.01)
G06Q 30/0601   (2023.01)

(52) U.S. Cl.
CPC .................. G06Q 30/0601 (2013.01)

(58) Field of Classification Search
CPC .................................. G06Q 30/06–08
See application file for complete search history.

(56) References Cited

U.S. PATENT DOCUMENTS

2021/0209643 A1*  7/2021  Manoharan ........ G06Q 30/0269
2022/0150553 A1*  5/2022  Ravuru ............ H04N 21/23439
2024/0135212 A1*  4/2024  Kennedy ................ G06N 20/00
2024/0330579 A1   10/2024  Saxena
2024/0354376 A1   10/2024  Tandon et al.
2024/0370898 A1   11/2024  Vakil et al.

OTHER PUBLICATIONS

Sophy, Joshua, "Small Business Trends: Omneky Launches Advertising Tool Using ChatGPT API", Newstex, Mar. 9, 2023 https://dialog.proquest.com/professional/docview/2784759391?accountid=131444 (Year: 2023).*

* cited by examiner

Primary Examiner — Ethan D Civan
(74) Attorney, Agent, or Firm — Cognition IP, P.C.; Edward Steakley

(57) ABSTRACT

Methods and systems provide for dynamic contextual generation of creative content for product listings. In one embodiment, the system receives initial product facts for a product, user engagement data for a user of a platform, and one or more pieces of contextual information related to how the product will be viewed within the platform; uses this data to train a generative AI model for dynamic creative content generation for the listing; uses the trained generative AI model to dynamically generate creative content for the listing; displays the creative content for the listing on a client device associated with the user; receives feedback regarding user engagement with the creative content in terms of whether an engagement objective has been achieved; and refines the generative AI model based on the received feedback, including optimizing the generative AI model to generate or modify the creative content to achieve the engagement objective.

19 Claims, 9 Drawing Sheets

DYNAMIC CONTEXTUAL GENERATION OF CREATIVE CONTENT FOR PRODUCT LISTINGS

CROSS-REFERENCE TO RELATED APPLICATIONS

This application claims the benefit of priority to U.S. Provisional Application No. 63/538,903, filed on Sep. 18, 2023, which is hereby incorporated by reference in its entirety.

FIELD OF INVENTION

Various embodiments relate generally to content generation, and more particularly, to systems and methods for providing dynamic contextual generation of creative content for product listings.

SUMMARY

The appended claims may serve as a summary of this application.

BRIEF DESCRIPTION OF THE DRAWINGS

The present invention relates generally to content generation, and more particularly, to systems and methods providing for dynamic contextual generation of creative content for product listings.

The present disclosure will become better understood from the detailed description and the drawings, wherein.

DETAILED DESCRIPTION

Figure 1A:
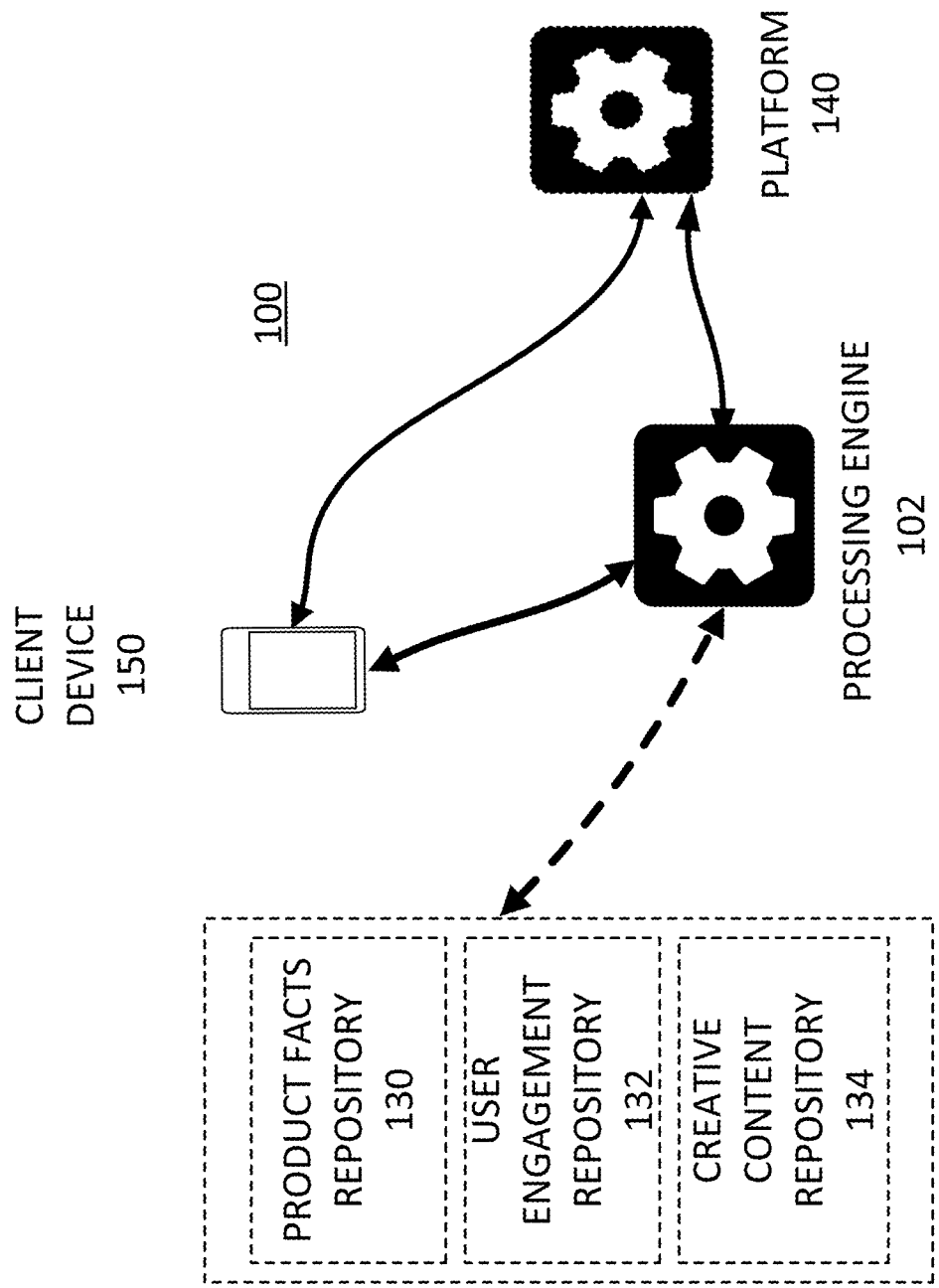
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

In the field of online content generation and user engagement optimization, the rapid evolution of e-commerce and digital advertising platforms has ushered in a new era of personalized content delivery. The significance of optimizing user engagement, particularly in the context of product listings, cannot be overstated. Effective user engagement can be a decisive factor in achieving sales, brand recognition, and overall success within digital platforms. However, prior methods of addressing this challenge have been encumbered by limitations that have hindered their ability to meet the dynamic and highly competitive nature of modern digital environments.

Historically, traditional product listings on e-commerce platforms have been static in nature, often consisting of fixed images, text descriptions, and basic product details. These static listings, while informative, lacked the adaptability required to cater to the diverse and evolving needs of online shoppers. Furthermore, the challenge of creating compelling and personalized content for each user proved to be a formidable task, often resulting in a one-size-fits-all approach. These limitations not only hampered the user experience but also hindered the ability of sellers and advertisers to maximize the potential of their products within the online marketplace.

Efforts to address these limitations led to the development of early content optimization techniques, which often relied on rule-based systems or rudimentary recommendation engines. These systems attempted to personalize content by considering user history and preferences, yet they frequently fell short in delivering truly dynamic and engaging experiences. Moreover, these approaches lacked the capability to adapt to rapidly changing market conditions, user behavior, and emerging trends. This rendered them inadequate for meeting the demands of modern digital platforms where competition is fierce, and user expectations are constantly evolving.

As the digital landscape evolved, the limitations of rule-based and recommendation systems became more apparent.

The need for a more sophisticated and adaptable approach to content generation and user engagement optimization became evident. This led to the emergence of artificial intelligence ("AI") and machine learning ("ML") as potential solutions. These technologies held promise in their ability to harness vast datasets and adapt in real-time to user behavior and preferences. However, early AI and ML models faced their own set of challenges, including the need for substantial training data, computational resources, and a mechanism to continually refine and optimize content.

Thus, the current techniques for user engagement optimization for digital content, particularly product listings, have been marked by static and rule-based approaches that struggled to deliver dynamic, personalized, and adaptable experiences for users. As the digital landscape evolved, these limitations became increasingly apparent, driving the need for more sophisticated solutions. The emergence of AI and ML have presented promising avenues for improvement, but significant challenges remain in terms of data, computational requirements, and ongoing optimization.

Thus, there is a need in the field of content generation to create a new and useful system and method for providing dynamic contextual generation of creative content for product listings. The source of the problem, as discovered by the inventors, is the absence of a system capable of harnessing AI and ML techniques to create highly personalized, dynamic, and contextually relevant content for product listings in real-time. This system should not only meet user engagement objectives, but also empower sellers and advertisers to maximize the potential of their products within digital platforms.

In one embodiment, the system receives one or more initial product facts for a product, wherein the product has been requested to be listed within a platform, user engagement data for a user of the platform, and one or more pieces of contextual information related to how the product will be viewed within the platform; uses the initial product facts, the user engagement data, and the pieces of contextual information to train a generative AI model for dynamic creative content generation for the listing; uses the trained generative AI model to dynamically generate one or more pieces of creative content for the listing; displays the one or more pieces of creative content for the listing on a client device associated with the user; receives feedback regarding user engagement with the pieces of creative content in terms of whether an engagement objective has been achieved; and refines the generative AI model based on the received feedback, including optimizing the generative AI model to generate or modify the pieces of creative content to achieve the engagement objective.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150, and a platform 140 are connected to a processing engine 102. The processing engine 102 is optionally connected to one or more repositories and/or databases. Such repositories and/or databases may include, for example, a product facts repository 130, a user engagement repository 132, and a creative content repository 134. One or more of such repositories may be combined or split into multiple repositories. The client device 150 in this environment may be a computer, and the platform 140 and processing engine 102 may be, in whole or in part, applications or software hosted on a computer or multiple computers which are communicatively coupled via remote server or locally.

The exemplary environment 100 is illustrated with only one client device, one processing engine, and one platform, though in practice there may be more or fewer additional client devices, processing engines, and/or platforms. In some embodiments, the client device, processing engine, and/or platform may be part of the same computer or device.

Figure 2:
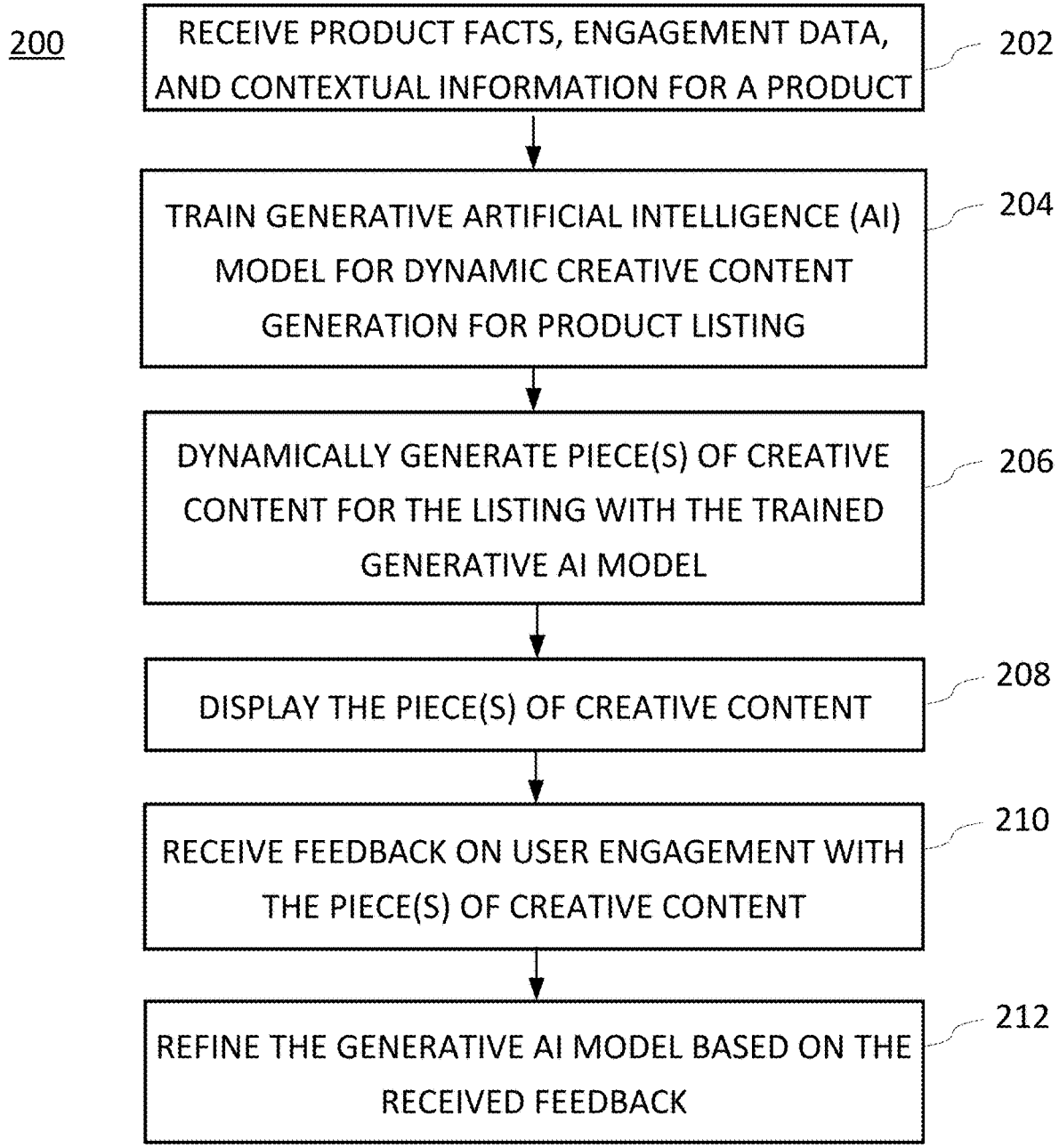
FIG. 2 is a flow chart illustrating an exemplary method that may be performed in some embodiments.

In an embodiment, the processing engine 102 may perform the method 200 (FIG. 2) or other method herein and, as a result, provide for dynamic contextual generation of creative content for product listings. In some embodiments, this may be accomplished via communication with the client device, additional client device(s), processing engine 102, platform 140, and/or other device(s) over a network between the device(s) and an application server or some other network server. In some embodiments, one or both of the processing engine 102 and platform 140 may be an application, browser extension, or other piece of software hosted on a computer or similar device, or in itself a computer or similar device configured to host an application, browser extension, or other piece of software to perform some of the methods and embodiments herein.

In some embodiments, the processing engine 102 performs processing tasks partially or entirely on the client device 102 in a manner that is local to the device and relies on the device's local processor and capabilities. In some embodiments, the processing engine 102 may perform processing tasks in a manner such that some specific processing tasks are performed locally, such as, e.g., visual AI processing tasks, while other processing tasks are performed remotely via one or more connected servers. In yet other embodiments, the processing engine 102 may processing tasks entirely remotely.

In some embodiments, client device 150 may be a device with a display configured to present information to a user of the device. In some embodiments, the client device 150 presents information in the form of a user interface (UI) with UI elements or components. In some embodiments, the client device 150 sends and receives signals and/or information to the processing engine 102 pertaining to the communication platform. In some embodiments, client device 150 is a computer device capable of hosting and executing one or more applications or other programs capable of sending and/or receiving information. In some embodiments, the client device 150 may be a computer desktop or laptop, mobile phone, virtual assistant, virtual reality or augmented reality device, wearable, or any other suitable device capable of sending and receiving information. In some embodiments, the processing engine 102 and/or platform 140 may be hosted in whole or in part as an application or web service executed on the client device 150. In some embodiments, one or more of the communication platform 140, processing engine 102, and client device 150 may be the same device. In some embodiments, the platform 140 and/or the client device 150 are associated with one or more particular user accounts.

In some embodiments, optional repositories function to store and/or maintain, respectively, product facts related to a product, user engagement data, and creative content generated for product listings. The optional repositories may also store and/or maintain any other suitable information for the processing engine 102 to perform elements of the methods and systems herein pertaining to the platform. In some embodiments, the optional database(s) can be queried by one or more components of system 100 (e.g., by the processing engine 102), and specific stored data in the database(s) can be retrieved.

The platform is a platform configured to provide dynamic, contextual generation of creative content. In some embodiments, the platform may be hosted within an application that can be executed on the user's client device, such as a smartphone application.

Figure 1B:
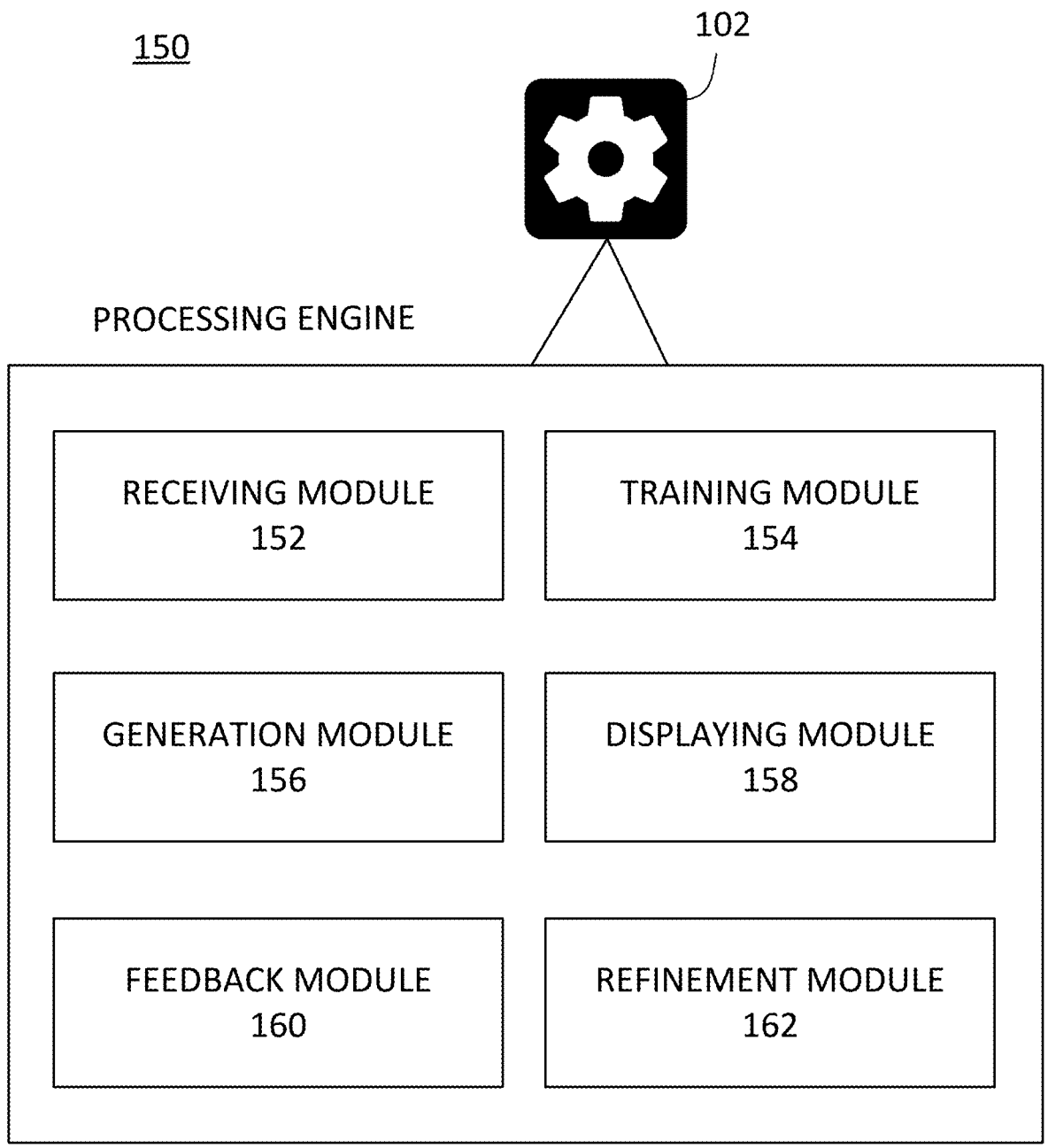
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Receiving module 152 functions to receive one or more initial product facts for a product, wherein the product has been requested to be listed within a platform; user engagement data for a user of the platform; and one or more pieces of contextual information related to how the product will be viewed within the platform.

Training module 154 functions to uses the initial product facts, the user engagement data, and the pieces of contextual information to train a generative AI model for dynamic creative content generation for the listing.

Generation module 156 functions to uses the trained generative AI model to dynamically generate one or more pieces of creative content for the listing.

Displaying module 158 functions to display the one or more pieces of creative content for the listing on a client device associated with the user.

Feedback module 160 functions to receive feedback regarding user engagement with the pieces of creative content in terms of whether an engagement objective has been achieved.

Refinement module 162 functions to refine the generative AI model based on the received feedback, including optimizing the generative AI model to generate or modify the pieces of creative content to achieve the engagement objective.

The functionality of the above modules will be described in further detail with respect to the exemplary method of FIG. 2A below.

FIG. 2A is a flow chart illustrating an exemplary method that may be performed in some embodiments.

At step 202, the system receives one or more initial product facts for a product, wherein the product has been requested to be listed within a platform, user engagement data for a user of the platform, and one or more pieces of contextual information related to how the product will be viewed within the platform.

In some embodiments, the system receives one or more initial product facts for a product, which refers to various pieces of information about a product which may be relevant or necessary for creating accurate and informative product listings or descriptions within a digital platform. These product facts may provide a comprehensive understanding of the product and its key attributes, characteristics, and/or details. In various embodiments, such product facts may include, for example: a product title, a product description, one or more product images, a price or fee, product availability, technical specifications and/or features of the product, reviews and/or ratings of the product, variations of the product, options for purchasing the product, warranty information, return policy, product brand, product manufacturer, product distributor, or any other relevant product information.

In some embodiments, the system receives user engagement data for a user of the platform, which provides the system with data on, e.g., user's behavior, preferences, and/or interactions within the digital platform. It can include, for example, information on completed sales associated with the user, user interactions with various elements of the platform, and/or the user's viewing patterns.

In some embodiments, the user engagement data includes signals or pieces of information regarding one or more of: data on completed sales associated with the user on a platform where the listing is hosted, data on user interaction with one or more interactive elements of the listing, and data on user viewing of elements of the listing. First, the user engagement data may include data on completed sales associated with the user on the platform where the listing is hosted. This data can include records of, e.g., the user's past purchases, providing valuable information about their preferences and buying history. By analyzing these sales records, the generative artificial intelligence (AI) model can tailor the creative content to align with the user's previous purchasing behavior, increasing the likelihood of future sales. Second, the user engagement data can encompass data on user interaction with one or more interactive elements of the product listing. This can involve tracking how users engage with various components of the listing, such as, e.g., clicking on product images, reading descriptions, or interacting with buttons like "add to cart." In some embodiments, the AI model can use this information to optimize the placement and design of interactive elements in the creative content. Additionally, the user engagement data may include data on user viewing of elements within the product listing. This data can provide insights into what aspects of the listing capture the user's attention and for how long. By analyzing user viewing patterns, the AI model can emphasize or modify certain elements in the creative content to maximize user engagement.

In some embodiments, the system receives one or more pieces of contextual information related to how the product will be viewed within the platform, which adds a layer of adaptability and responsiveness to the content generation process. Context is a critical factor when determining how to generate creative content for a product listing. In various embodiments, this contextual information can include, for example, details such as the time of day, the geographic location of the user, and/or the specific search query employed by the user. Incorporating this contextual information ensures that the generated content is not only user-specific, but also contextually relevant, increasing the likelihood of capturing the user's interest.

At step 204, the system uses the initial product facts, the user engagement data, and the pieces of contextual information to train a generative AI model for dynamic creative content generation for the listing. In some embodiments, this process leverages machine learning and AI techniques to train the generative AI model to create tailored and contextually relevant creative content for product listings within a digital platform.

In some embodiments, the initial product facts serve as inputs for the model's training to include details such as, e.g., the product's title, description, and images. In some embodiments, the user engagement data is additionally used as input for the model's training to take into account the behavior and preferences of the platform's users when generating creative content for a product listing. In some embodiments, the inclusion of contextual information adds an additional layer of input to the AI model's training. Contextual information pertains to how the product will be perceived or viewed within the platform, considering factors like the time of day, geographic location of the user, and the user's search query. This contextual insight allows the AI model to adapt creative content generation to align with specific user scenarios, making it more relevant and appealing.

In some embodiments, the AI model's training involves using machine learning algorithms to identify patterns, relationships, and trends within the combined dataset of product facts, user engagement data, and contextual information. It learns to recognize which product attributes and content elements are most effective in engaging users and driving desired outcomes, such as sales or interactions. As a result of this training, the AI model becomes proficient in dynamically generating creative content for product listings. This content can include product titles, descriptions, and images tailored to suit different user contexts and preferences. The dynamic nature of content generation ensures that product listings remain fresh and relevant, adapting to evolving user behavior and market dynamics.

In some embodiments, the generative AI model is a large language model (hereinafter "LLM"). An LLM is a type of artificial intelligence model that is specifically designed to process and generate human language. These models are characterized by their extensive training on vast corpora of text data, allowing them to understand and generate text in a coherent and contextually relevant manner. In various embodiments, LLMs can be leveraged in various ways to enhance the effectiveness of the creative content being generated.

In various embodiments, LLMs can be used for one or more of: creating compelling product titles, descriptions, and/or promotional messages; adapting the tone of the content based on user engagement data and contextual information; ensuring that the generated text resonates with the target audience; analyzing and understanding natural language queries, reviews, comments, conversations, and feedback from users related to products; generating content in multiple languages based on geographical location; analyzing user engagement data to understand individual preferences; employing sentiment analysis to gauge user sentiment towards products and tailor content accordingly; identifying relevant keywords and phrases that are currently trending or commonly used in the platform; generating diverse content variations for the same product; creating multiple versions of creative content for A/B testing; and any other relevant purpose an LLM may be used for.

In some embodiments, the generative AI model uses a deep learning architecture. Deep learning represents a subset of machine learning that mimics the human brain's neural networks to process and analyze vast amounts of data. In some embodiments, the generative AI model's deep learning architecture enables it to continuously learn and improve its creative content generation abilities over time. Deep learning models can efficiently process and analyze large datasets, including extensive data on, e.g., product listings, user behavior, and/or platform dynamics.

In some embodiments, the generative AI model is additionally trained on user engagement and sales data to optimize for maximized sales. To achieve this, the system leverages the wealth of data available regarding user behavior and sales patterns. Training the model on sales data provides insights into what product listings and creative content have historically led to successful transactions. This information can be useful in training the generative AI model to generate content that aligns with user preferences and market trends.

In some embodiments, the generative AI model is additionally trained on one or more previous listings which are not currently listed within the environment. This can be useful when previous listings can provide insights into market trends and/or changing user preferences over time, when products have seasonal or cyclical popularity or context, when products are relisted after being previously listed on the platform, or any other relevant purpose.

In some embodiments, the generative AI model is trained further on a large dataset of listings. The broader and more diverse the dataset the model is trained on, the more adept it becomes at understanding user behavior, platform intricacies, and market trends. By training the generative AI model on a substantial dataset of listings, the system ensures that the creative content being produced is not only contextually relevant but also adaptable to various users, platforms, and contexts. In some embodiments, this additional training on a large dataset of listings empowers the AI model with a wealth of knowledge about, e.g., various products, markets, and consumer preferences.

At step 206, the system uses the trained generative AI model to dynamically generate one or more pieces of creative content for the listing. Upon the completion of the training in step 204, the generative AI model is now trained to generative creative content based on the insights and understanding of how to do so that was gained from the initial product facts, user engagement data, and contextual information as training inputs. In some embodiments, the piece of creative content is generated based on features that are both true and relevant to the specifics of the user engagement data, the contextual listing data, and the initial product facts. The generative AI model then leverages this comprehensive understanding to generate creative content that is not only relevant, but also optimized for user engagement.

The term "creative content" encompasses various elements that contribute to an appealing product listing. These elements can include, e.g., product titles, descriptions, and images. In some embodiments, the generative AI model's dynamic generation capabilities mean that it can adapt these elements based on the specific circumstances of the user and the product to generate different pieces of creative content for the same product listing, depending on, e.g., different contexts or users with differing preferences or engagement behaviors. For example, the generative AI model may generate different product titles for morning and evening shoppers, or tailor product descriptions differently to resonate with two different users located in different geographic regions.

In some embodiments, the generative AI model's ability to generate multiple pieces of creative content is advantageous. It provides flexibility for testing different approaches and variations to determine what resonates most effectively with users. In some embodiments, this process of content generation and testing is iterative, contributing to the continuous refinement of product listings, improving their overall performance.

In some embodiments, the piece of creative content is generated by the generative AI model to differ from one or more additional product listings presented concurrently to the user. In some embodiments, the generated piece of creative content is generated at least in part with an objective to compete with other concurrent listings within the environment to prevent all concurrent listings from having too-similar creative content. In some embodiments, the generated piece of creative content is generated at least in part to satisfy an objective of diversity in creative content with respect to concurrent listings within the environment according to user perception.

By producing creative content that highlights unique niches or features of a product that other products lack, the system can capture users' attention and encourage them to explore further. To achieve this differentiation, the system's generative AI model strategically analyzes the competition. It assesses the creative content of other listings, considering factors like product descriptions, titles, and images. The system then leverages this information to generate creative content that sets the product apart from the competition. For example, if several listings offer similar smartphones, the system may choose to highlight unique features of a particular phone, such as its advanced camera technology or exceptional battery life. By doing so, the generated content ensures that each listing offers something distinct, preventing redundancy and aiding users in making informed decisions.

In another example, if a user has shown a preference for eco-friendly products, the system can emphasize the environmental benefits of a particular product in its creative content, differentiating it from other listings. This tailored approach ensures that the creative content aligns with the user's interests and stands out among competing listings.

In some embodiments, the system can identify specific niches or unique selling points of a product and emphasize these in the creative content. For example, if a pair of running shoes has superior shock-absorption technology, the system can highlight this feature, especially if other concurrently presented listings lack such technology. By showcasing distinctive product attributes that cater to specific user needs, the system maximizes the likelihood of engagement and conversion.

At step 208, the system displays the one or more pieces of creative content for the listing on a client device associated with the user. Following the dynamic generation of creative content by the generative AI model, the system displays these generated pieces of content to the user.

In some embodiments, the generated creative content, which can include rich media such as, e.g., images, text, interactive elements, user interface elements, dynamic elements, and/or video, is transmitted and presented to the user's client device. This client device could be, for example, a smartphone, tablet, desktop computer, or any other device capable of accessing and displaying digital content which contains rich media elements. Importantly, the content is tailored to the user's specific engagement with the platform, ensuring that it resonates with their preferences and needs, as well as contextual information pertinent to the situation, such as, for example, the time of day the listing will be viewed. The client device serves as the interface through which the user interacts with the digital platform. In some embodiments, displaying the content on this device includes presenting the content in a format that is accessible and visually appealing to the user. For instance, if the user is browsing an e-commerce app on their smartphone, the content can be optimized for mobile viewing, ensuring a seamless and engaging experience.

In some embodiments, the timing of when content is displayed to the user is also taken into consideration when presenting the content. In such embodiments, the content is presented to the user at the right moment to maximize its impact. For example, if a user is in the middle of exploring a product category, the relevant content may be displayed immediately to capture their attention and guide their decision-making process.

At step 210, the system receives feedback regarding user engagement with the pieces of creative content in terms of whether an engagement objective has been achieved. In some embodiments, the system prompts to user to provide feedback on how the user engages with this content, and the user submits feedback in response. This feedback serves as a source of information for the system to evaluate whether a specific engagement objective has been achieved.

In various embodiments, engagement objectives can vary depending on the context. In some embodiments, the engagement objective revolves around user interaction and response to the displayed content. For instance, if the objective is to increase product sales, the feedback might focus on whether the user has made a purchase of the product in question after viewing the generated creative content, or added the corresponding product to an e-commerce cart after viewing the generated creative content. In some embodiments, if the goal is to encourage interaction, feedback may include data on, e.g., user clicks, taps, or other interactions with the content.

In some embodiments, the feedback received from users can help identify user preferences and trends, allowing for the adaptation of content strategies to better align with user expectations. For instance, if users consistently respond positively to certain types of content, the generative AI model can be adjusted to generate more of that content.

At step 212, the system refines the generative AI model based on the received feedback, including optimizing the generative AI model to generate or modify the pieces of creative content to achieve the engagement objective. This optimization contributes to the continuous improvement of the system's ability to meet engagement objectives effectively.

In some embodiments, refining the generative AI model is essentially an optimization process. It involves analyzing the feedback data to understand how well the generated content is performing in terms of achieving the specified engagement objectives. This optimization aims to enhance the model's capability to produce creative content for listings in successive sessions that better aligns with user expectations and desired outcomes.

In various embodiments, optimization may take several forms, depending on the nature of the feedback and the objectives. In some embodiments, optimization may include content modification. If the feedback indicates that certain aspects of the creative content are not resonating with users, for example, the generative AI model can be adjusted to modify those elements in future generation of creative content, or in generating alternate versions of the creative content for this product listing. This might involve, for example, changing the wording of a product description, adjusting image choices, or altering the overall layout to better capture user attention. In some embodiments, elements of the creative content may be added or removed.

In some embodiments, the underlying algorithms of the generative AI model can be fine-tuned based on feedback. This could include, for example, changes to how the model prioritizes different input data (e.g., product facts, user engagement data, and/or contextual information) or how it generates creative content based on specific user demographics or preferences. In some embodiments, the system may determine that the engagement objective needs to be reevaluated based on the user feedback or engagement data. For example, if the original objectives prove unattainable or unrealistic, they can be adjusted to better reflect the actual user behavior and expectations.

In some embodiments, the generative AI model can be designed to learn from feedback over time. As it receives more data, it becomes increasingly adept at predicting what types of content will yield the desired engagement outcomes. In some embodiments, the user feedback can be used to conduct A/B testing, where multiple versions of content are generated and shown to different user groups. The performance of these variations can inform which content strategies are most effective.

In some embodiments, the optimization is based on at least one or more other concurrent generated pieces of creative content for listings within the environment. The optimization process can employ a comparative approach. In some embodiments, this approach involves assessing the performance of the dynamically generated creative content for a particular product listing in relation to other concurrently generated content within the same environment. These concurrent pieces of content may pertain to similar or different products but share the same platform or environment.

This optimization mechanism operates dynamically, continually adapting and refining the generative AI model based on the ongoing performance of multiple content pieces. If certain content variations consistently outperform others in achieving engagement objectives, the model can prioritize generating similar content in the future.

In some embodiments, the engagement objective relates to one or more of: sales of the product within the platform, interaction with one or more interactive elements of the listing, and user viewing of elements of the listing. The engagement objective in this context is used to measure the effectiveness of the generated creative content in various ways. These objectives encompass a range of user interactions and behaviors within the platform. In some embodiments, the primary focus of the objective is on the sales of the product within the platform, i.e., to facilitate transactions. In some embodiments, the engagement objective extends to encompass the interaction with one or more interactive elements of the listing. This emphasizes the importance of user engagement beyond mere transactions. It includes user actions such as clicking on product images, reading product descriptions, or engaging with any interactive features designed to enhance the user experience. In some embodiments, user viewing of elements of the listing is considered a critical engagement objective. This reflects the significance of capturing user attention and ensuring that users are not just passing by but actively engaging with the content presented. In some embodiments, it can encompass factors like the duration of time users spend on a product listing and their engagement with various visual and textual elements.

In some embodiments, the engagement objective includes both maximizing sales for the platform and maximizing sales for a seller or distributor of the product. First, the engagement objective seeks to maximize sales for the platform itself. This aligns with the platform's overarching goal of facilitating transactions and revenue generation. By optimizing the generative AI model to generate creative content that effectively drives sales within the platform, this method contributes to the platform's financial success and sustainability. However, the engagement objective also focuses on maximizing sales for the seller or distributor of the product listed within the platform. This is a crucial consideration because, in many e-commerce scenarios, multiple sellers or distributors compete on the same platform. Each of them seeks to enhance their sales and visibility. By incorporating this dual objective, the method acknowledges the seller's need for effective product listings that result in increased sales.

In some embodiments, the system uses the piece of creative content in ranking and allocation models for use in one or more of: search engine optimization, advertisement ranking optimization, and advertisement bidding auctions. In some embodiments, the system is configured to utilize the generated creative content in search engine optimization (hereinafter "SEO"). By incorporating the creative content into various SEO strategies, the method enhances the discoverability of the product listings on search engines. This is particularly crucial as, for example, users often begin their online shopping journeys with search queries.

In some embodiments, the system uses the creative content for advertisement ranking optimization. Many e-commerce platforms rely on advertisements to promote products. Effective ad placement and ranking are essential for attracting user attention. By integrating the generated content into ad ranking models, the method ensures that the advertisements associated with the product listings achieve optimal visibility and engagement.

In some embodiments, the system uses the creative content for advertisement bidding auctions, which are commonly used for ad placement. The creative content generated by the method can be valuable in crafting compelling ad campaigns, potentially leading to more competitive bids and better ad placement.

In some embodiments, the system employs one or more caching or approximation systems so that the generative AI model is configured to be executable in real-time in a maximally cost-efficient way. In various embodiments, such caching or approximation systems could be used for pre-generation of creative content, creating variations on a product listing, performing contextual caching that takes into account contextual factors, rotation of content periodically, on-demand generation of creative content, or any other relevant purpose for caching or approximation of creative content.

In some embodiments, the generated piece of creative content is used in one or more additional listings in environments. In some embodiments, the system disseminates the generated content across a spectrum of listings and digital environments. Such content can seamlessly adapt to different listing scenarios. This can be, for example, a product featured on an e-commerce platform, a social media ad, or a search engine result, with the creative content being optimized for each environment.

Figure 3A:
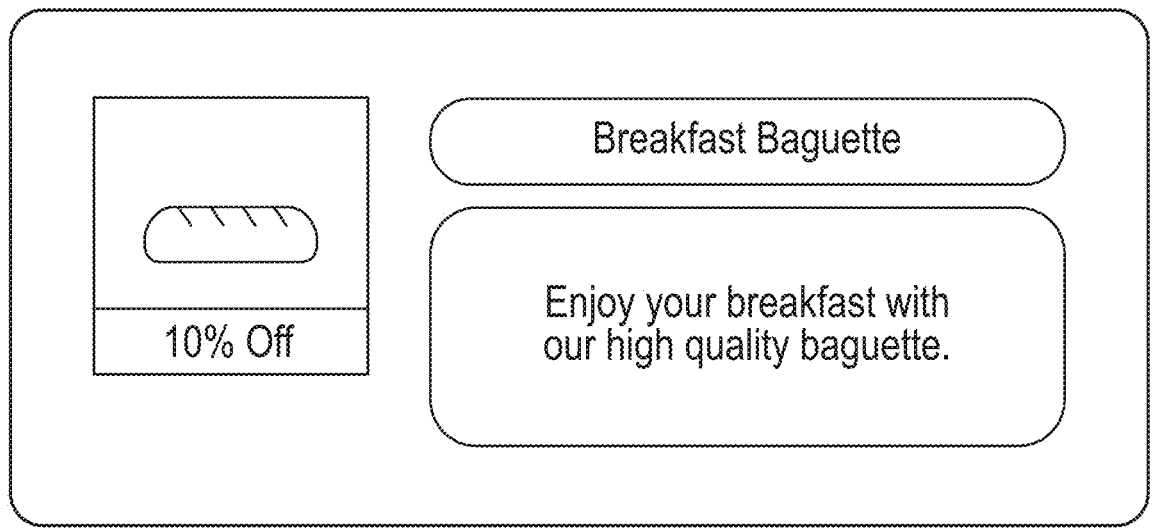
FIG. 3A is a diagram illustrating one example embodiment of creative content generated for a product listing, in accordance with some embodiments of the invention.

FIG. 3A is a diagram illustrating one example embodiment of creative content generated for a product listing, in accordance with some embodiments of the invention. The depicted creative content is designed to showcase a product, specifically a baguette, and to convey appealing and engaging information to potential customers.

In this illustrative example, an image of the baguette takes center stage, occupying a prominent portion of the creative content. In some embodiments, the image is a photo or visual depiction of the product that has been provided as part of the initial product facts, while in other embodiments, the image is dynamically generated by the generative AI model as part of the rich media generated for the creative content. Below the image, a clear and attention-grabbing promotional element is presented. The words "10% off" are prominently displayed, conveying a special offer to potential customers. This discount information is strategically placed to capture the viewer's attention and create a sense of value.

To the right of the image and the promotional offer, the product title and description are shown. The product title reads "Breakfast Baguette," succinctly identifying the product and providing clarity to potential buyers. The choice of a descriptive and appetizing title aims to engage the audience and communicate the product's purpose. In this example, contextual information received by the system indicates that the time of day is morning, specifically before or during a time in which the user may wish to purchase a breakfast item. In this situation, "breakfast" is used within this product title to optimize engagement based on the context of the time of day.

Beneath the product title, a concise product description is presented. It reads, "Enjoy your breakfast with our high-quality baguette." This description serves to inform customers about the product's quality and its suitability for the specific time of day in which the user is viewing the product listing.

The depicted example illustrates how the inventive system generates and arranges visually appealing and informative creative content for product listings, taking into account contextual information to achieve an engagement objective such as a user purchasing the product that is presented. By combining imagery, promotional elements, and product titles and descriptions relevant to the user's context, the system aims to capture user interest and encourage engagement with the listed product. This visually enticing representation contributes to improved user experiences and enhanced marketing effectiveness within the platform.

Figure 3B:
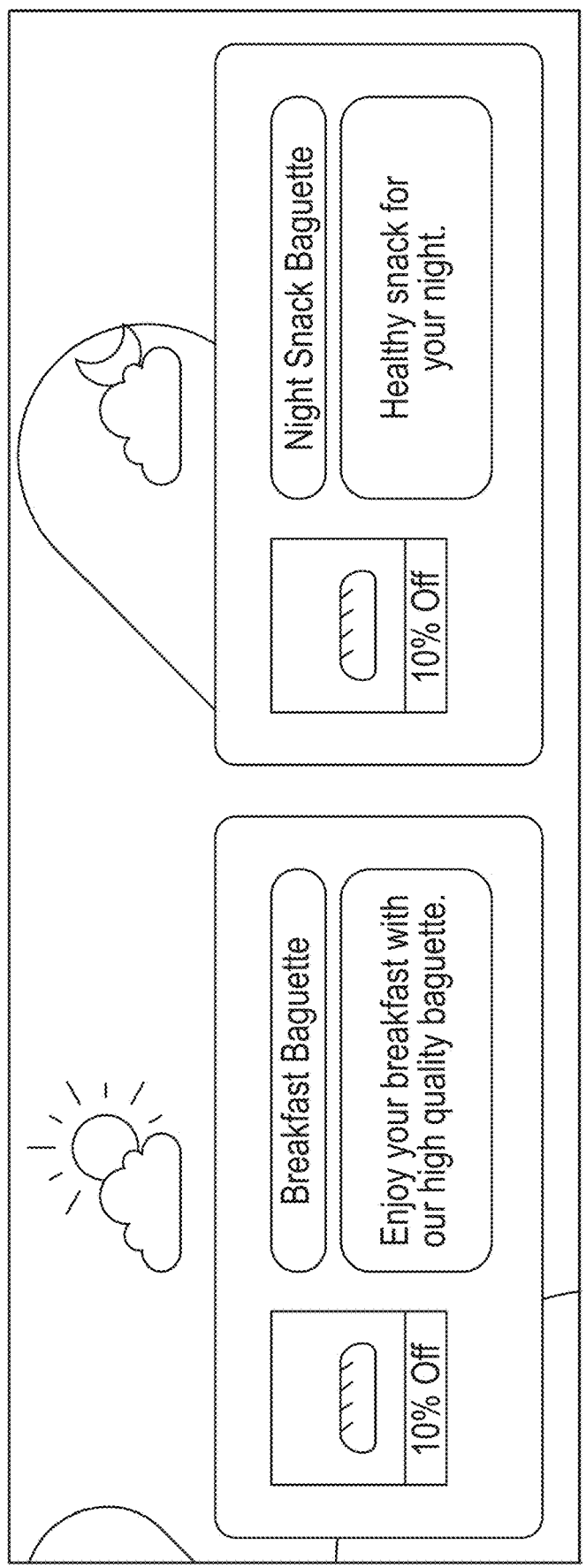
FIG. 3B is a diagram illustrating one example embodiment of a generative AI model producing different pieces of creative content for the same product according to different contextual scenarios, in accordance with some embodiments of the invention.

FIG. 3B is a diagram illustrating one example embodiment of a generative AI model producing different pieces of creative content for the same product according to different contextual scenarios, in accordance with some embodiments of the invention. On the left side of the figure, the original product listing is showcased, mirroring the example previously seen in FIG. 3A. This representation is specifically optimized for morning viewing by users, aligning with the notion that certain products may be more appealing or relevant at different times of the day.

The left-side listing is identical to the listing depicted in FIG. 3A, showing a product title of "Breakfast Baguette". The listing shown on the right side is a different product listing with different creative content for the same product, representing a product listing intended for evening viewing. In this context, the same image of the baguette remains. The promotional element offering "10% off" also remains. However, the product title now reads "Night Snack Baguette," effectively repositioning the product for a different use case as a nighttime snack. The accompanying product description has also been adjusted to "Healthy snack for your night," aligning with the revised product positioning.

This example illustrates the capability of the generative AI model to adapt and create distinct product listings tailored to various contextual scenarios, such as morning and evening viewing. By customizing product titles and descriptions while preserving essential elements, the system maximizes the relevance and appeal of product listings to users based on their specific needs, preferences, and context for viewing the material. This variation in product listings based on contextual information enhances user engagement and increases the likelihood of successfully achieving an engagement objective within the platform.

Figure 3C:
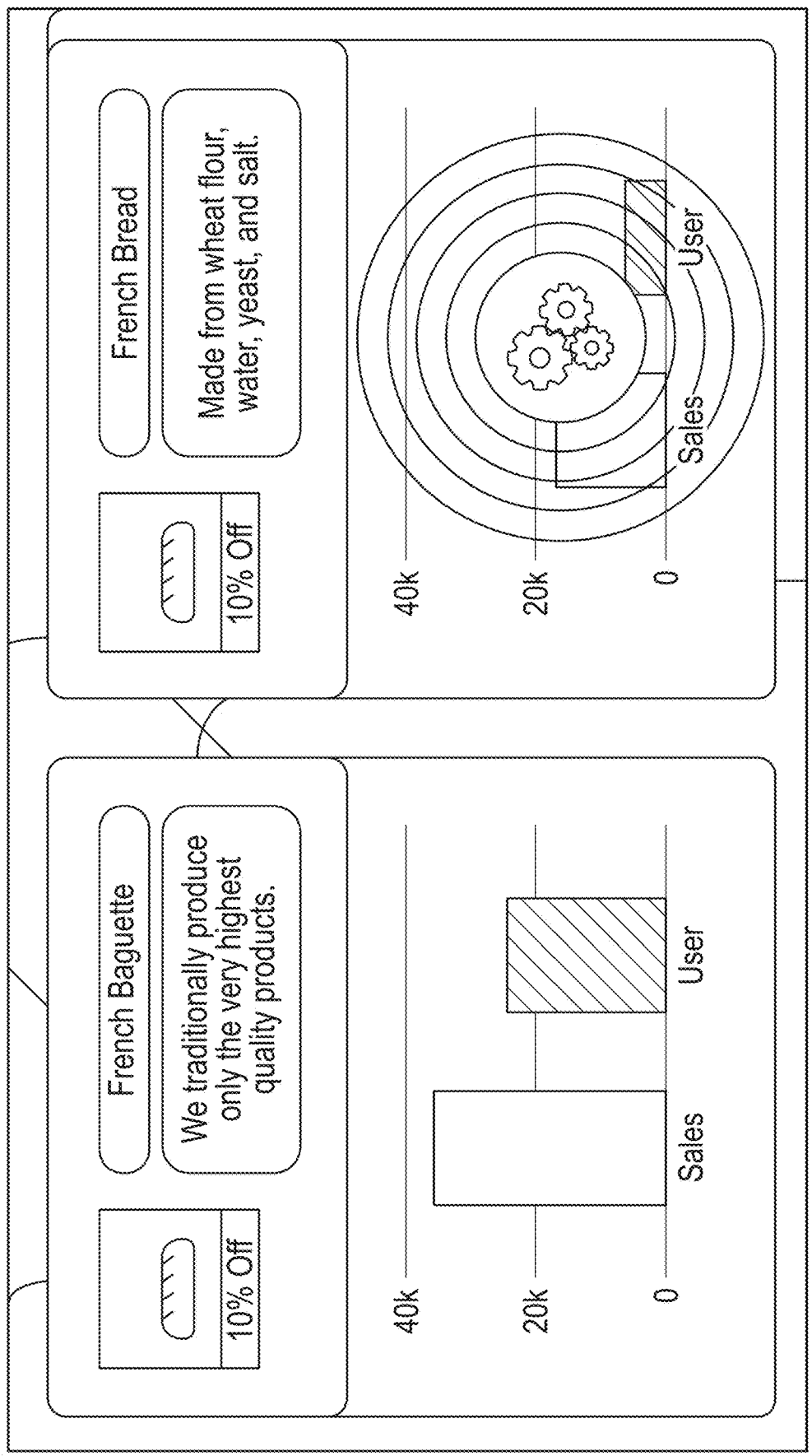
FIG. 3C is a diagram illustrating one example embodiment of a generative AI model producing different pieces of creative content for the same product according to different regional geographic locations of users, in accordance with some embodiments of the invention.

FIG. 3C is a diagram illustrating one example embodiment of a generative AI model producing different pieces of creative content for the same product according to different regional geographic locations of users, in accordance with some embodiments of the invention.

The example depicts three separate product listings, each uniquely configured to resonate with users in specific regional contexts. In some embodiments, these variations extend beyond mere translation and encompass comprehensive localization, ensuring that the product listings align with the cultural and linguistic nuances of each geographic area. Starting from the left, the first product listing showcases the title "Cali Baguette." This representation is tailored for users in California. The corresponding product description aligns with this regional focus, providing information in English.

The second product listing in the top right presents the title "La Baguette", with a product description in French. This version of the product listing caters to users in a different geographic location than the first product listing, specifically a region in Eastern Canada where French is predominantly used and understood.

The third product listing in the bottom right adopts the title "Pan Caliente Baguette." Here, the generative AI model targets users in yet another distinct regional area, specifically a region in Latin America where Spanish is predominantly used and understood. The product description is similarly written in Spanish.

Figure 3D:
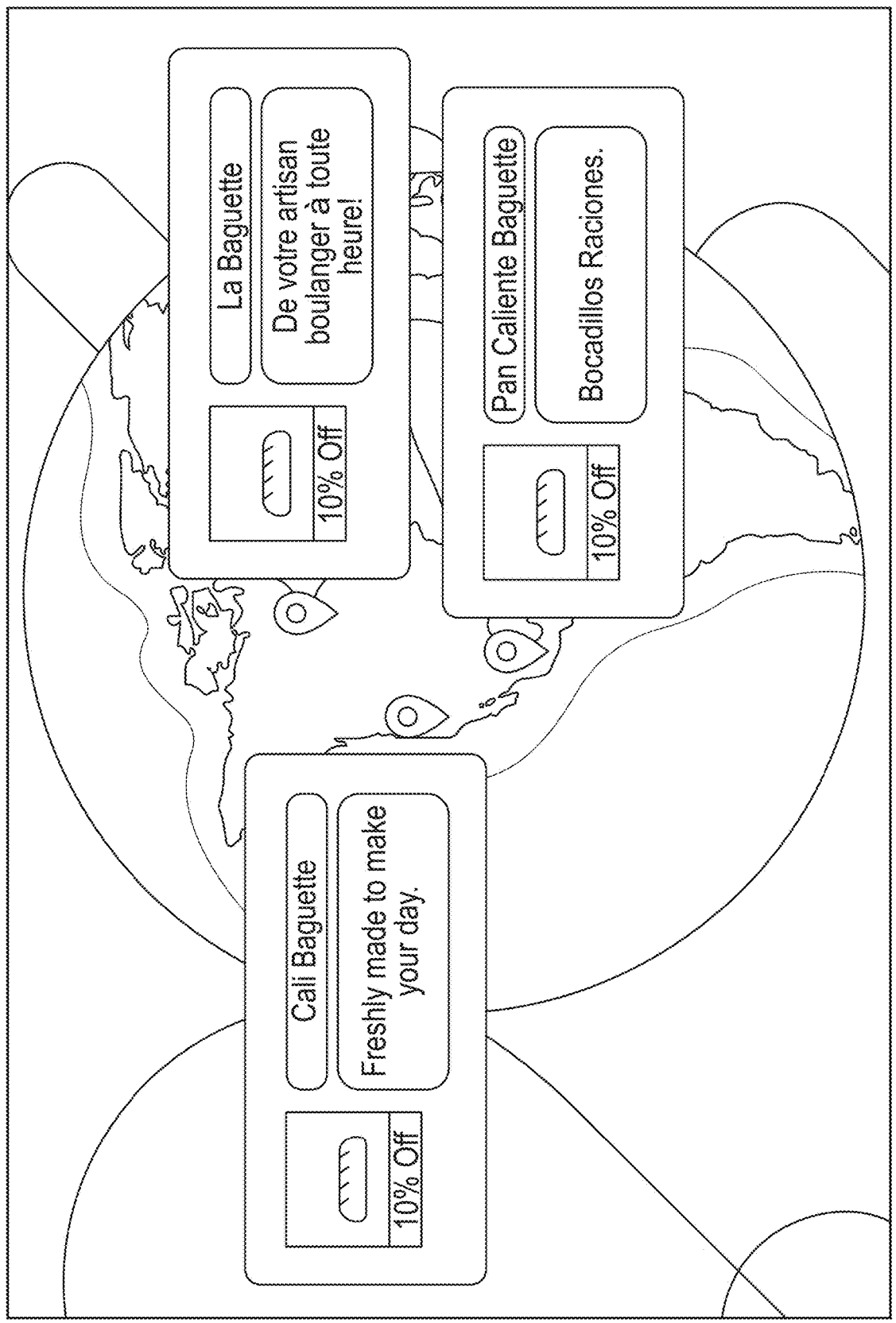
FIG. 3D is a diagram illustrating one example embodiment of a generative AI model producing different pieces of creative content for the same product to align with items present in users' e-commerce carts, in accordance with some embodiments of the invention.
Figure 3E:
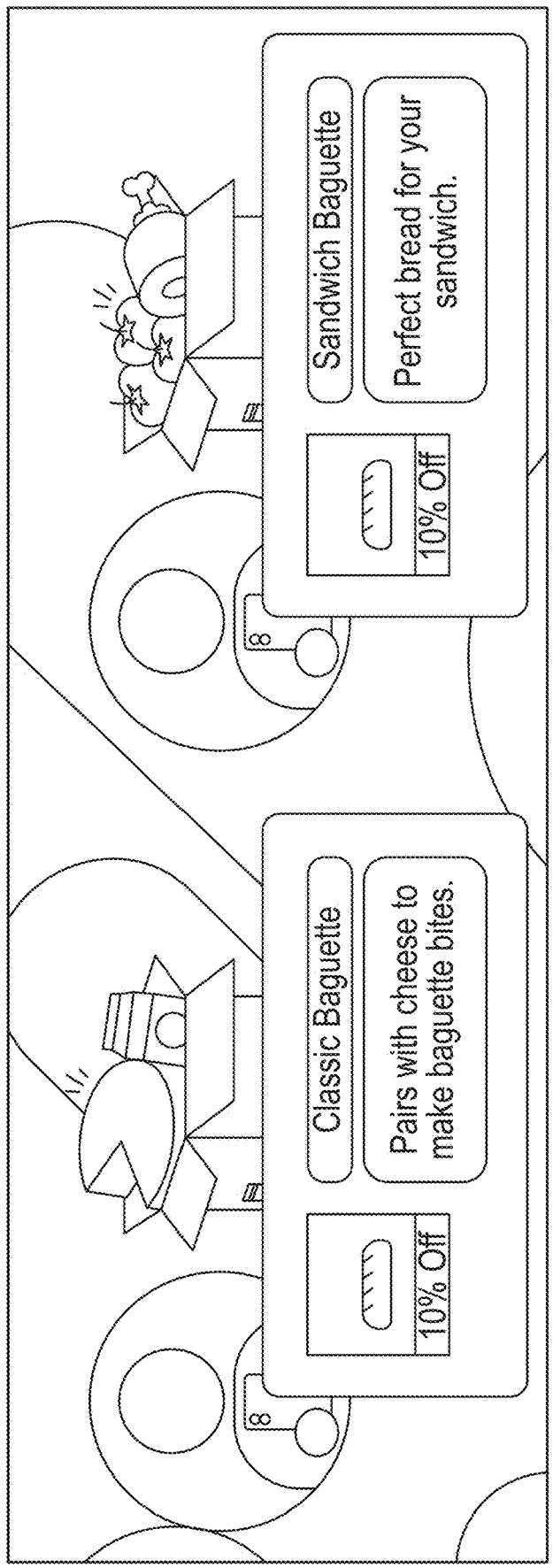
FIG. 3E is a diagram illustrating one example embodiment of a generative AI model producing different pieces of creative content for the same product to align with items present in users' e-commerce carts, in accordance with some embodiments of the invention.

FIG. 3D is a diagram illustrating one example embodiment of a generative AI model producing different pieces of creative content for the same product to align with items present in users' e-commerce carts, in accordance with some embodiments of the invention. This adaptive use case enhances the user experience and achieves engagement objectives by offering product descriptions to different users that seamlessly integrate with each user's potential purchase intentions.

On the left side of the figure, a user is depicted with a block of cheese in their e-commerce cart. In response to this context, the generative AI model generates a product listing for the baguette that is aligned with and complimentary to the user's intended purchases. The product description reads, "Pairs with cheese to make baguette bites." This description not only highlights the product's compatibility with the cheese but also suggests a specific culinary use, enhancing the user's perception of the product's value.

Conversely, on the right side of the figure, another user is presented with a different set of items in their e-commerce cart, including tomatoes and meat. Recognizing this distinct context, the generative AI model dynamically generates a tailored product listing for the baguette. In this case, the product description reads, "Perfect bread for your sandwich." This description is contextually relevant, as it complements the user's potential purchase of sandwich ingredients, providing a cohesive and satisfying shopping experience. This example underscores the system's ability to adapt product listings based on the contents of a user's cart, effectively cross-promoting complementary items and simplifying the user's decision-making process. This context-aware approach not only increases the likelihood of achieving engagement objectives, but also enhances user satisfaction by presenting relevant and valuable information.

Figure 4:
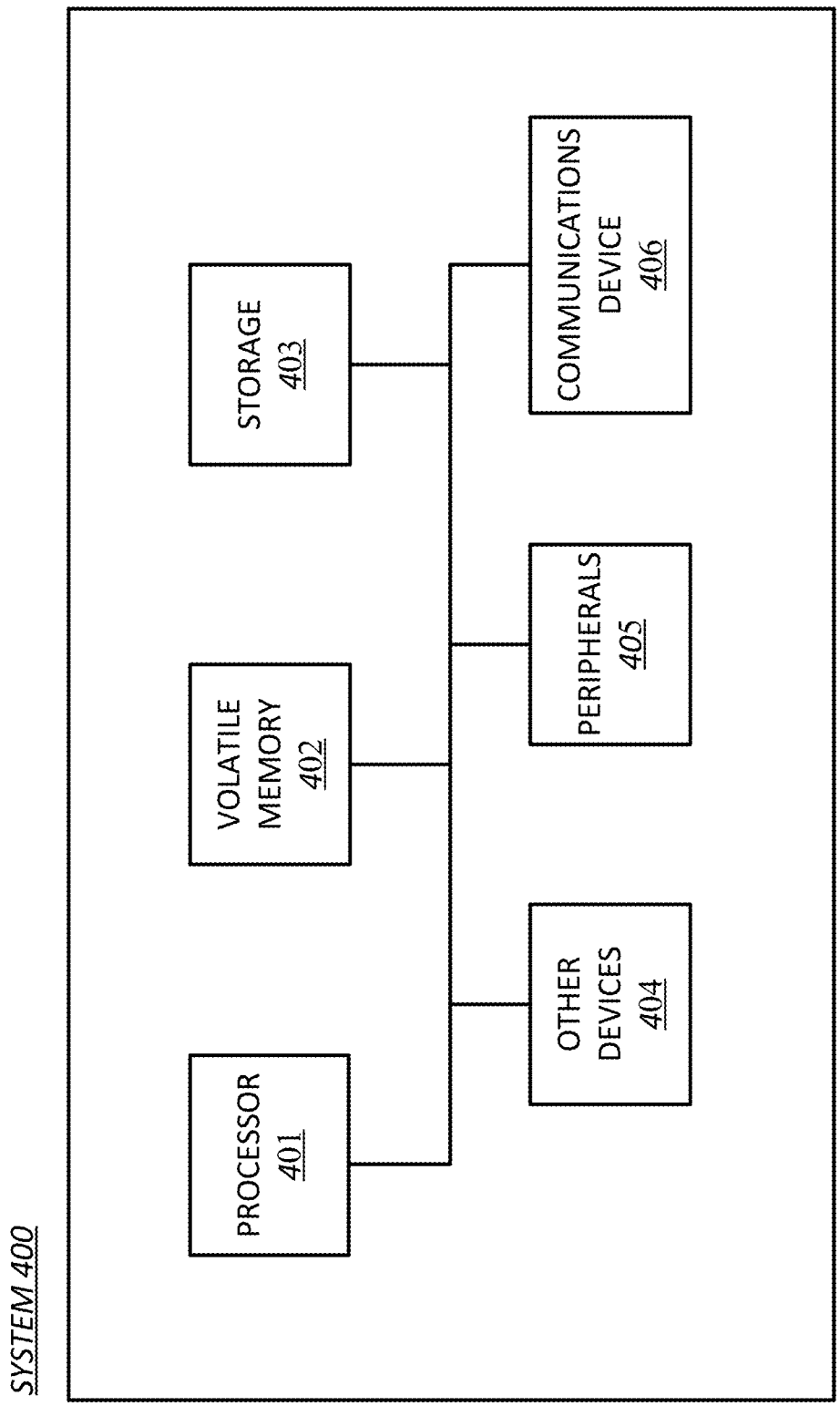
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage.

Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving:
      one or more initial product facts for a product, wherein the product has been requested to be listed within a platform,
      user engagement data for a user of the platform, and
      one or more pieces of contextual information related to how the product will be viewed within the platform, wherein the received contextual listing data comprises one or more of: the time of day of the listing, a geographic location, and a search query;
   using the initial product facts, the user engagement data, and the pieces of contextual information to train a generative artificial intelligence (AI) model for dynamic creative content generation for the listing, wherein the generative AI model is a large language model (LLM);
   using the trained generative AI model to dynamically generate one or more pieces of creative content for the listing, wherein the generated piece of creative content comprises a generated first description based on the contextual information;
   displaying, via the platform, the one or more pieces of creative content for the listing to a client device associated with the user;
   receiving feedback regarding user engagement with the pieces of creative content in terms of whether an engagement objective has been achieved, the feedback comprising information about whether the user has made a purchase of a product associated with the generated creative content, or about whether the user added a corresponding product associated with the creative content to an e-commerce cart;
   refining the generative AI model based on the received feedback, wherein the refining comprises optimizing the generative AI model to generate or modify the pieces of creative content to achieve the engagement objective;
   using the trained generative AI model to dynamically generate other one or more pieces of creative content for the listing, wherein the generated piece of creative content comprises a generated second description based on contextual information associated with another user; and displaying, via the platform, to a client device of the another user, the other one or more pieces of creative content for the listing to a client device associated with the another user, wherein the generated first description is different than the generated second description.

2. The method of claim 1, wherein the user engagement data comprises signals or pieces of information regarding one or more of: data on completed sales associated with the user on a platform where the listing is hosted, data on user interaction with one or more interactive elements of the listing, and data on user viewing of elements of the listing.

3. The method of claim 1, wherein the initial product facts comprise one or more of: a title, a description, and a product image.

4. The method of claim 1, the optimizing being based on at least one or more other concurrent generated pieces of creative content for listings within the environment.

5. The method of claim 1, wherein the engagement objective relates to one or more of: sales of the product within the platform, interaction with one or more interactive elements of the listing, and user viewing of elements of the listing.

6. The method of claim 1, wherein the engagement objective comprises both maximizing sales for the platform and maximizing sales for a seller or distributor of the product.

7. The method of claim 1, further comprising:
using the piece of creative content in ranking and allocation models for use in one or more of: search engine optimization, advertisement ranking optimization, and advertisement bidding auctions.

8. The method of claim 1, wherein the piece of creative content is generated by the generative AI model to differ from one or more additional product listings presented concurrently to the user.

9. The method of claim 1, wherein the piece of creative content is generated based on features that are both true and relevant to the specifics of the user engagement data, the contextual listing data, and the initial product facts.

10. A system comprising one or more processors configured to perform the operations of:
receiving:
one or more initial product facts for a product, wherein the product has been requested to be listed within a platform,
user engagement data for a user of the platform, and
one or more pieces of contextual information related to how the product will be viewed within the platform, wherein the received contextual listing data comprises one or more of: the time of day of the listing, a geographic location, and a search query;
using the initial product facts, the user engagement data, and the pieces of contextual information to train a generative artificial intelligence (AI) model for dynamic creative content generation for the listing, wherein the generative AI model is a large language model (LLM);
using the trained generative AI model to dynamically generate one or more pieces of creative content for the listing, wherein the generated piece of creative content comprises a generated first description based on the contextual information;
displaying, via the platform, the one or more pieces of creative content for the listing to a client device associated with the user;
receiving feedback regarding user engagement with the pieces of creative content in terms of whether an engagement objective has been achieved, the feedback comprising information about whether the user has made a purchase of a product associated with the generated creative content, or about whether the user added a corresponding product associated with the creative content to an e-commerce cart;
refining the generative AI model based on the received feedback, wherein the refining comprises optimizing the generative AI model to generate or modify the pieces of creative content to achieve the engagement objective;
using the trained generative AI model to dynamically generate other one or more pieces of creative content for the listing, wherein the generated piece of creative content comprises a generated second description based on contextual information associated with another user; and
displaying, via the platform, to a client device of the another user, the other one or more pieces of creative content for the listing to a client device associated with the another user, wherein the generated first description is different than the generated second description.

11. The system of claim 10, wherein the generative AI model is additionally trained on user engagement and sales data to optimize for maximized sales.

12. The system of claim 10, wherein the generative AI model is additionally trained on one or more previous listings which are not currently listed within the environment.

13. The system of claim 10, wherein the generated piece of creative content is generated at least in part with an objective to compete with other concurrent listings within the environment to prevent all concurrent listings from having too-similar creative content.

14. The system of claim 10, wherein the generated piece of creative content is generated at least in part to satisfy an objective of diversity in creative content with respect to concurrent listings within the environment according to user perception.

15. The system of claim 10, wherein the one or more processors are further configured to perform the operation of:
employing one or more caching or approximation systems so that the generative AI model is configured to be executable in real-time in a maximally cost-efficient way.

16. The system of claim 10, wherein the generated piece of creative content is used in one or more additional listings in environments.

17. The system of claim 10, wherein the generative AI model is trained further on a large dataset of listings.

18. The system of claim 10, wherein the generated piece of creative content is optimized to be utilized for a specific language or geographic region.

19. A non-transitory computer-readable medium comprising:
instructions for receiving:
one or more initial product facts for a product, wherein the product has been requested to be listed within a platform,
user engagement data for a user of the platform, and one or more pieces of contextual information related to how the product will be viewed within the platform, wherein the received contextual listing data comprises one or more of: the time of day of the listing, a geographic location, and a search query;

instructions for using the initial product facts, the user engagement data, and the pieces of contextual information to train a generative artificial intelligence (AI) model for dynamic creative content generation for the listing, wherein the generative AI model is a large language model (LLM);

instructions for using the trained generative AI model to dynamically generate one or more pieces of creative content for the listing, wherein the generated piece of creative content comprises a generated first description based on the contextual information;

instructions for displaying, via the platform, the one or more pieces of creative content for the listing to a client device associated with the user;

instructions for receiving feedback regarding user engagement with the pieces of creative content in terms of whether an engagement objective has been achieved, the feedback comprising information about whether the user has made a purchase of a product associated with the generated creative content, or about whether the user added a corresponding product associated with the creative content to an e-commerce cart;

instructions for refining the generative AI model based on the received feedback, wherein the refining comprises optimizing the generative AI model to generate or modify the pieces of creative content to achieve the engagement objective;

instructions for using the trained generative AI model to dynamically generate other one or more pieces of creative content for the listing, wherein the generated piece of creative content comprises a generated second description based on contextual information associated with another user; and instructions for displaying, via the platform, to a client device of the another user, the other one or more pieces of creative content for the listing to a client device associated with the another user, wherein the generated first description is different than the generated second description.

* * * * *

UNITED STATES PATENT AND TRADEMARK OFFICE
CERTIFICATE OF CORRECTION

PATENT NO. : 12,307,492 B2
APPLICATION NO. : 18/823432
DATED : May 20, 2025
INVENTOR(S) : Andrew Donald Yates It is certified that error appears in the above-identified patent and that said Letters Patent is hereby corrected as shown below:

In the Claims

Column 16, Lines 35 and 36, please replace "wherein the received contextual listing data comprises one or more of: the time of day of the" with "wherein the one or more pieces of contextual information comprises one or more of: a time of day of a" -- Claim 1
Column 16, Line 38, please replace "using the initial" with "using the one or more initial" -- Claim 1
Column 16, Line 39, please replace "and the pieces" with "and the one or more pieces" -- Claim 1
Column 16, Line 46, please replace "of: the time" with "of: a time" -- Claim 1
Column 16, Line 52, please replace "with the pieces" with "with the one or more pieces" -- Claim 1
Column 16, Line 57, please replace "generated creative" with "generated piece of creative" -- Claim 1
Column 16, Line 62, please replace "modify the pieces" with "modify the one or more pieces" -- Claim 1
Column 17, Line 16, please replace "wherein the initial" with "wherein the one or more initial" -- Claim 3
Column 17, Line 21, please replace "within the environment" with "within an environment" -- Claim 4
Column 17, Line 32, please replace "using the piece" with "using the generated piece" -- Claim 7
Column 17, Line 36, please replace "wherein the piece" with "wherein the generated piece" -- Claim 8
Colum 17, Line 41, please replace "wherein the piece" with "wherein the generated piece" -- Claim 9
Column 17, Line 42, please delete "the" after "relevant to" -- Claim 9
Column 17, Lines 43 and 44, please replace "engagement data, the contextual listing data, and the initial" with "engagement data, the one or more pieces of contextual information, and the one or more initial" -- Claim 9
Column 17, Line 54, please replace "the received contextual listing data" with "the one or more pieces of contextual information" -- Claim 10
Column 17, Line 55, please replace "of: the time of day of the listing" with "of: a time of day of a listing" -- Claim 10
Column 17, Line 57, please replace "using the initial" with "using the one or more initial" -- Claim 10
Column 17, Line 58, please replace "and the pieces of" with "and the one or more pieces" -- Claim 10

Signed and Sealed this
Fifteenth Day of July, 2025

Coke Morgan Stewart
*Acting Director of the United States Patent and Trademark Office*

CERTIFICATE OF CORRECTION (continued)
U.S. Pat. No. 12,307,492 B2

Column 17, Line 65, please replace "wherein the generated" with "wherein a generated" -- Claim 10
Column 18, Lines 4 and 5, please replace "with the pieces" with "with the one or more pieces" -- Claim 10
Column 18, Line 9, please replace "generated creative content" with "generated piece of creative content" -- Claim 10
Column 18, Lines 15 and 16, please replace "modify the pieces" with "modify the one or more pieces" -- Claim 10
Column 18, Lines 34 and 35, please replace "within the environment" with "within an environment" -- Claim 12
Column 18, Lines 37 and 38, please replace "listing within the environment" with "listing within an environment" -- Claim 13
Column 18, Line 44, please replace "within the environment" with "within an environment" -- Claim 14
Column 18, Line 47, please replace "perform the operation" with "perform an operation" -- Claim 15
Column 19, Lines 3 and 4, please replace "wherein the received contextual listing data comprises one or more of: the time and day of the listing" with "wherein the one or more pieces of contextual information comprises one or more of: a time of a day of a listing" -- Claim 19
Column 19, Line 6, please replace "using the initial" with "using the one or more initial" -- Claim 19
Column 19, Line 7, please replace "and the pieces" with "and the one or more pieces" -- Claim 19
Column 19, Line 14, please replace "wherein the generated" with "wherein a generated" -- Claim 19
Column 19, Line 21, please replace "engagement with the pieces" with "engagement with the one or more pieces" -- Claim 19
Column 20, Line 2, please replace "the generated creative" with "the generated piece of creative" -- Claim 19
Column 20, Line 8, please replace "modify the pieces" with "modify the one or more pieces" -- Claim 19